United States Patent
Miyata

(10) Patent No.: US 7,375,833 B2
(45) Date of Patent: May 20, 2008

(54) INFORMATION PROCESSING DEVICE, PAGE DESCRIPTION LANGUAGE GENERATING METHOD, PROGRAM, AND STORAGE MEDIUM

(75) Inventor: Junichi Miyata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 984 days.

(21) Appl. No.: 10/813,406

(22) Filed: Mar. 29, 2004

(65) Prior Publication Data

US 2004/0190010 A1    Sep. 30, 2004

(30) Foreign Application Priority Data

Mar. 31, 2003   (JP) .............................. 2003-097189

(51) Int. Cl.
*B41B 15/00* (2006.01)
*B41B 1/00* (2006.01)
*G06F 17/00* (2006.01)

(52) U.S. Cl. ...................... 358/1.13; 358/1.1; 358/1.16

(58) Field of Classification Search ................ 358/1.1, 358/1.13, 1.16; 715/200, 211
See application file for complete search history.

(56) References Cited

U.S. PATENT DOCUMENTS 6,025,923 A * 2/2000 Kageyama et al. ........ 358/1.14
6,891,632 B2 * 5/2005 Schwartz .................. 358/1.15

* cited by examiner

*Primary Examiner*—King Y. Poon
*Assistant Examiner*—Neil R McLean
(74) *Attorney, Agent, or Firm*—Canon U.S.A. Inc., IP Division

(57) ABSTRACT

An information processing device determines whether or not drawing commands received from an application are logical drawing commands, and in the event that the received drawing commands are determined to be logical drawing commands, the received drawing commands are held and compared with entries in a reference table, where determination is made regarding whether there are any entries matching the received drawing commands, and in the event that there is a matching entry, a substitution drawing command is output to substitute for the corresponding drawing command, thereby generating a page description language. This enables optimizing complicated raster operations using applications, both in output size and drawing quality, and correct drawing even with non-supporting page description language systems.

24 Claims, 9 Drawing Sheets

IMAGE WHEREIN BIT STRING OF XOR2 IS MASKED WITH BLACK PORTION OF AND1 =

IMAGE WHEREIN BIT STRING OF OR1 IS MASKED WITH BLACK PORTION OF AND2 = ~518

WHITE PORTION OF OR2 =  ~526

FIG. 6

| ADDRESS 601 | ROP STRUCTURE 602 | 602 | 602 | ROP STRUCTURE 602 | CONDITIONAL EXPRESSION 603 | OUTPUT COMMAND 604 |
|---|---|---|---|---|---|---|
| 0 | ROP STRUCTURE 1 | ...... | ...... | ROP STRUCTURE N | CONDITIONAL EXPRESSION 1 | DRAWING COMMAND |

FIG. 7

| ROP 701 |
|---|
| TYPE OF DRAWING 702 |
| APPLICATION NAME 703 |
| SIZE 704 |
| OTHER ATTRIBUTES 705 |
| ...... 705 |

FIG. 8

| ROP STRUCTURE | ROP STRUCTURE | ... | ROP STRUCTURE |
|---|---|---|---|

FIG. 10

| ADDRESS 1001 | ROP STRUCTURE 1002 | ROP STRUCTURE 1002 | ROP STRUCTURE 1002 | CONDITIONAL EXPRESSION 1003 | OUTPUT COMMAND 1004 |
|---|---|---|---|---|---|
| 0 | XOR1 | AND1 | XOR2 | XOR1 = XOR2 | DRAW PORTION WHEREIN BIT STRING OF XOR2 HAS BEEN MASKED WITH BLACK PORTION OF AND1 |
| 1 | AND2 | OR1 | | SIZE OF AND2 = SIZE OF OR1 | DRAW PORTION WHEREIN BIT STRING OF OR1 HAS BEEN MASKED WITH BLACK PORTION OF AND2 |
| 2 | OR2 | | | NONE | DRAW WHITE PORTION OF OR2 |

FIG. 11

| ROP | XOR1 |
|---|---|
| TYPE OF DRAWING | IMAGE |
| APPLICATION NAME | APPLICATION A |
| SIZE | 3 × 3 |
| BIT STRING | 010101010 |
| ⋮ | |

| ROP | AND1 |
|---|---|
| TYPE OF DRAWING | IMAGE |
| APPLICATION NAME | APPLICATION A |
| SIZE | 3 × 3 |
| BIT STRING | 011001001 |
| ⋮ | |

| ROP | XOR2 |
|---|---|
| TYPE OF DRAWING | IMAGE |
| APPLICATION NAME | APPLICATION A |
| SIZE | 3 × 3 |
| BIT STRING | 010101010 |
| ⋮ | |

INFORMATION PROCESSING DEVICE, PAGE DESCRIPTION LANGUAGE GENERATING METHOD, PROGRAM, AND STORAGE MEDIUM

BACKGROUND OF THE INVENTION

1. Field of the Invention

The present invention relates to page description language generated on an information processing device, and particularly relates to an image computation optimizing method for a system made up of an information processing device such as a personal computer or the like, and a printer device.

2. Description of the Related Art

Generally, with printing systems on an operating system (OS) running on an information processing device, print data from an application program is transmitted to a printing program as logical drawing commands. The printing program interprets the logical drawing commands, and generates a page description language.

At this time, the application can use raster operations (hereafter referred to as ROP operations) to make complicated shape expressions. However, there are some page description languages which do not support these complicated ROP operations (generally, in the case of not supporting, all is overwritten), and also, even in the event that the page description language does support these complicated ROP operations, outputting the operator components all the time means that redundant drawing commands are issued, which has become problematic from the perspective of performance.

Thus, with page description languages not supporting logical drawing commands, the same output as cases wherein the logical drawing commands are executed cannot be obtained. Also, even with page description languages capable of handling logical drawing commands, deterioration in performance is unavoidable due to issuing redundant drawing commands.

SUMMARY OF THE INVENTION

The present invention enables output which is equivalent to executing logical drawing commands even with page description languages which do not support logical drawing commands. Furthermore, the present invention eliminates redundant drawing commands so as to reduce the number of drawing commands necessary for obtaining output.

According to one aspect of the present invention, a method for generating page description language comprises the following:(a) accepting a drawing command; (b) determining whether or not the accepted drawing command is a logical drawing command; (c) if the accepted drawing command is a logical drawing command, adding the accepted drawing command to a held drawing command sequence table; (d) comparing the held drawing command sequence table with entries in a reference table including registered substitution conditions for drawing commands to determine if there is an entry in the reference table that matches the held drawing command sequence table; and (e) if there is an entry in the reference table that matches the held drawing command sequence table: (i) obtaining a substitution drawing command from the reference table for the entry in the reference table that matches the held drawing command sequence table; (ii) generating page description language by outputting the substitution drawing command; and (iii) clearing the held drawing command sequence table.

In accordance with another aspect of the present invention, if there are not any entries in the reference table that match the held drawing command sequence table, the method includes: generating page description language for the accepted drawing commands in the held drawing command sequence table by outputting the accepted drawing commands in the held drawing command sequence table based on an order of accepting the drawing commands in the held drawing command sequence table; and clearing the held drawing command sequence table.

In accordance with another aspect of the present invention, if there are not any entries in the reference table that match the held drawing command sequence table, the method includes: determining whether there is a possibility that at least one entry in the reference table will match the held command sequence table if additional drawing commands are accepted and added to the held drawing command sequence table; and if it is determined that there is a possibility that at least one entry in the reference table will match the held drawing command sequence table if additional drawing commands are accepted and added to the held drawing command sequence table, repeating (a)-(e) which are described above.

According to yet another aspect of the present invention, the method further comprises the following: if there are not any entries in the reference table that match the held drawing command sequence table and it is determined that there is not a possibility that any of the entries in the reference table will match the held drawing command sequence table if additional drawing commands are accepted and added to the held drawing command sequence table: generating page description language for the accepted drawing commands in the held drawing command sequence table by outputting the accepted drawing commands in the held drawing command sequence table based on an order of accepting the drawing commands in the held drawing command sequence table; and clearing the held drawing command sequence table.

According to yet another aspect of the present invention, the entries in the reference table include, as the registered substitution conditions, a type of drawing command, an order of accepting the drawing commands, and conditions regarding the drawing commands. In this case, determining if there is an entry in the reference table that matches the held drawing command sequence table may be determined based on whether or not the type of drawing command, the order of accepting the drawing commands, and the conditions regarding the drawing commands in the reference table, match those of the held drawing command sequence table. Furthermore, if there are not any entries in the reference table that match the held drawing command sequence table, determining whether there is a possibility that at least one entry in the reference table will match the held command sequence table if additional drawing commands are accepted and added to the held drawing command sequence table may be based on whether or not the type of drawing command, the order of accepting the drawing commands, and the conditions regarding the drawing commands for a portion of the at least one entry in the reference table, match those of the held drawing command sequence table.

In accordance with still another aspect of the present invention, the method may further comprise: if it is determined that the accepted drawing command is not a logical drawing command, generating page description language by outputting the accepted drawing command without substitution.

In accordance with another aspect of the present invention, a computer-readable program may comprise code for performing the method described above.

In accordance with yet another aspect of the present invention, an information processing device may include components for performing the method described above. The information processing device may include: drawing command accepting means for accepting a drawing command; determining means for determining whether or not the accepted drawing command is a logical drawing command; holding means for adding the accepted drawing command to a held drawing command sequence table if the accepted drawing command is a logical drawing command; comparing mans for comparing the held drawing command sequence table with entries in a reference table including registered substitution conditions for drawing commands to determine if there is an entry in the reference table that matches the held drawing command sequence table; and page description language generating means for, upon determination by the comparing means that there is an entry in the reference table that matches the held drawing command sequence table, obtaining a substitution drawing command from the reference table for the entry in the reference table that matches the held drawing command sequence table, generating page description language by outputting the substitution drawing command, and clearing the held drawing command sequence table.

Thus, according to the present invention, output can be obtained which is equivalent to executing logical drawing commands even with page description languages which do not support logical drawing commands, and redundant drawing commands can be reduced so as to reduce the number of drawing commands necessary for obtaining output.

Further features and advantages of the present invention will become apparent from the following description of the preferred embodiments with reference to the attached drawings.

BRIEF DESCRIPTION OF THE DRAWINGS

FIG. 6 is a diagram illustrating a configuration example of a ROP reference table corresponding to the embodiment of the present invention.

FIG. 7 is a diagram illustrating a configuration example of a ROP structure corresponding to the embodiment of the present invention.

FIG. 8 is a diagram illustrating a configuration example of a ROP sequence table corresponding to the embodiment of the present invention.

FIG. 10 is an example of a ROP reference table according to the embodiment of the present invention.

FIG. 11 is an example of a ROP structure according to the embodiment of the present invention.

DESCRIPTION OF THE PREFERRED EMBODIMENTS

The following is a description of preferred embodiments of the present invention.

First Embodiment

Figure 1:
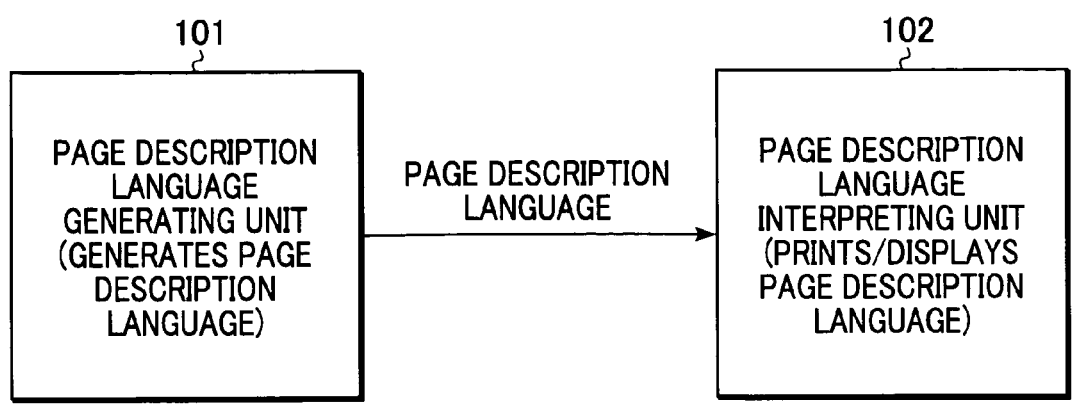
FIG. 1 is a conceptual view of an example of a system configuration corresponding to an embodiment of the present invention.

FIG. 1 is a conceptual diagram illustrating the configuration of a printing system, illustrating an embodiment of the present invention. The embodiment shown includes a page description language generating unit 100 including a printing program which generates page description language according to the present invention, and an interpreting unit 102 which interprets page description language which the printing program has generated. The interpreting unit 102 is a unit which interprets page description language, and realizes printing, or displays the page description language.

Figure 2:
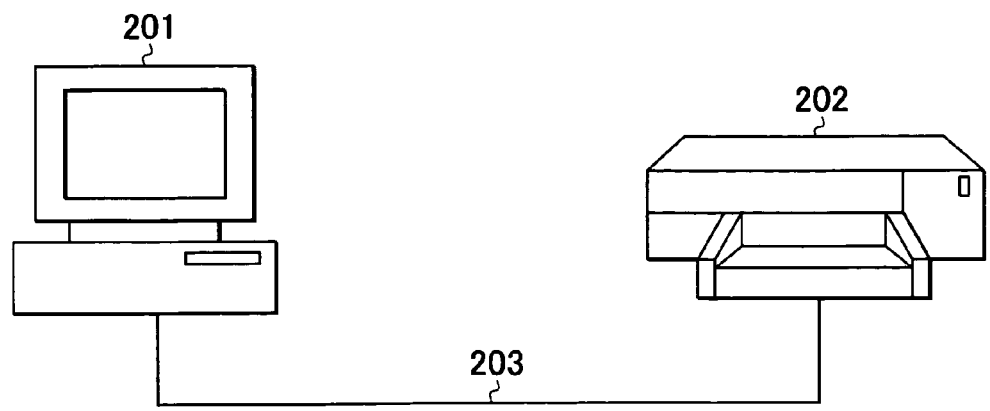
FIG. 2 is a diagram illustrating a general example of the system shown in FIG. 1.

An example of a configuration of the printing system shown in FIG. 1 is a printer printing system such as shown in FIG. 2. In FIG. 2, an information processing device 201 is connected to a printer device 202 via a communication link 203. The connection 203 between the information processing device 201 and the printer device 202 may be a direct connection or a network connection. The printing program on the information processing device 201 is the page description language generating unit 101, and the printer device 202 which interprets page description language and outputs this on physical paper is the page description language interpreting unit 102.

With the present embodiment, while the following description will proceed with reference to the system configuration illustrated in FIG. 2, the present invention can also be applied to arrangements where the page description language interpreting unit 102 is on the same information processing device 201 as a page description language display application, or where this is not another information processing device.

Figure 3:
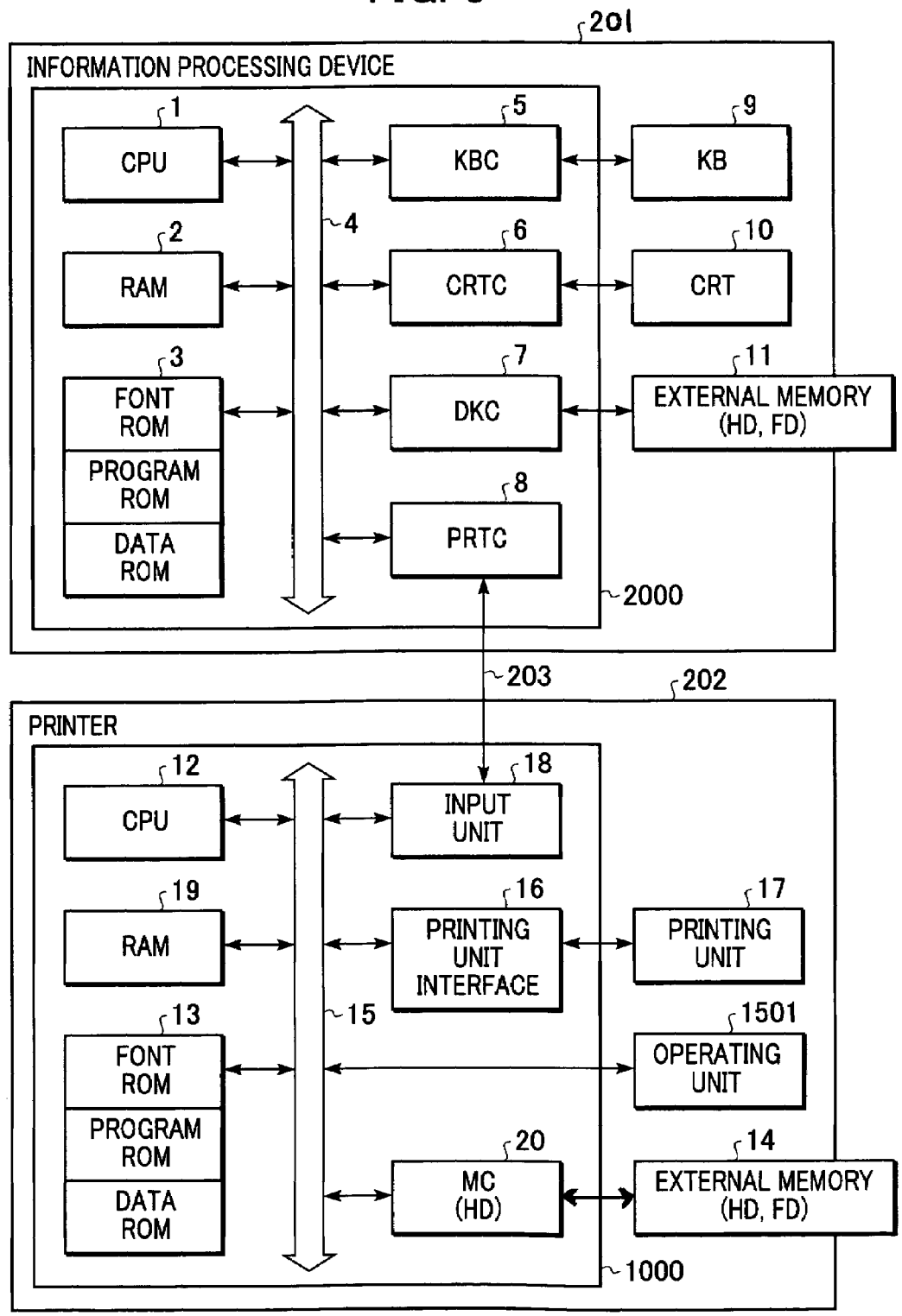
FIG. 3 is a block diagram illustrating an example of the detailed configuration of a system corresponding to the embodiment of the present invention.

FIG. 3 is a block diagram illustrating in further detail components of the information processing device 201 and the printer device 202 shown in FIG. 2. The information processing device 201 shown in FIG. 2 includes a CPU (central processing unit) 1 which executes processing of documents wherein shapes, images, text, charts (including spreadsheets), and the like, coexist, based on document processing applications or the like stored in program (read-only memory) ROM within ROM 3 or external memory 11, such as a hard drive (HD) or a diskette (FD). The CPU 1 centrally controls each device connected to the system bus 4.

The program ROM within the ROM 3 or the external memory 11 stores the operating system program which is the control program for the CPU 1, font ROM within the ROM 3 or the external memory 11 stores font data and the like used for processing documents, and data ROM within the ROM 3 or the external memory 11 stores various types of data to be used in processing the documents.

RAM (random access memory) 2, functions as the main memory for the CPU 1, work area, and the like. A keyboard controller (KBC) 5, controls key input from a keyboard 9 or a pointing device (not shown). A video controller (CRTC) 6 controls a display device 10 such as a CRT (cathode ray tube) display or (LCD) liquid crystal display or the like.

A disk controller (DKC) 7 controls access with a hard disk (HD), diskettes (FD), and other external memory 11, which stores boot programs, various types of applications, font data, user files, editing files, and the printing program according to the present invention, and so forth.

A printer controller (PRTC) 8 is connected with a printer 202 via a predetermined two-directional interface 203 and controls communication with the printer 202.

The CPU 1 executes outline font rendering (rasterizing) to display information RAM provided in the RAM 2 for example, thereby enabling WYSIWYG (what you see is what you get) display on the CRT 10. Also, the CPU 1 opens various types of windows registered based on commands instructed with an unshown mouse cursor or the like on the CRT 10 so as to perform various types of data processing. At the time of the user executing printing, the user opens a window relating to printing settings, and can perform settings for the printing processing method for the printing program according to the present invention.

In the printer device 202, a printer CPU 12 outputs image signals as output information to a printing unit (printer engine) 17 connected to a system bus 15, based on a control program stored in program ROM in the ROM 13 or a control program or the like which interprets the page description language stored in external memory 14. Also, the program ROM of the ROM 13 stores control programs and the like for the CPU 12.

The font ROM of the ROM 13 stores font data and the like to be used for generating the output information, and in the event that the printer has no external memory 14 such as a hard disk, the data ROM of the ROM 13 stores information and the like to be used by the host computer.

The CPU 12 is capable of communication processing with the host computer 201 via an input unit 18 and is capable of notifying the host computer 201 regarding information and the like within the printer 202. The RAM 10 functions as the main memory, work area, etc., of the CPU 12, and is configured such that the memory capacity can be expanded by optional RAM connected to an unshown expansion port.

The RAM 19 is used for: an output information rendering region, an environmental data storing region, NVRAM (non-volatile random access memory), and the like. The aforementioned hard disk (HD), IC card, and other external memory 14, are subjected to access control by a memory controller (MC) 20. The external memory 14 is optionally connected, for storing font data, emulation programs, form data, and so forth. Also, switches and LED display devices and the like for operating are arrayed on an operating panel of the input unit 18.

Note that the above-described external memory is not restricted to one, rather more than one may be connected, and may be configured so as to have optional font cards besides the fonts originally included, multiple external memory devices storing programs for interpreting the page description language according to the present invention, and so forth, connected.

Figure 4:
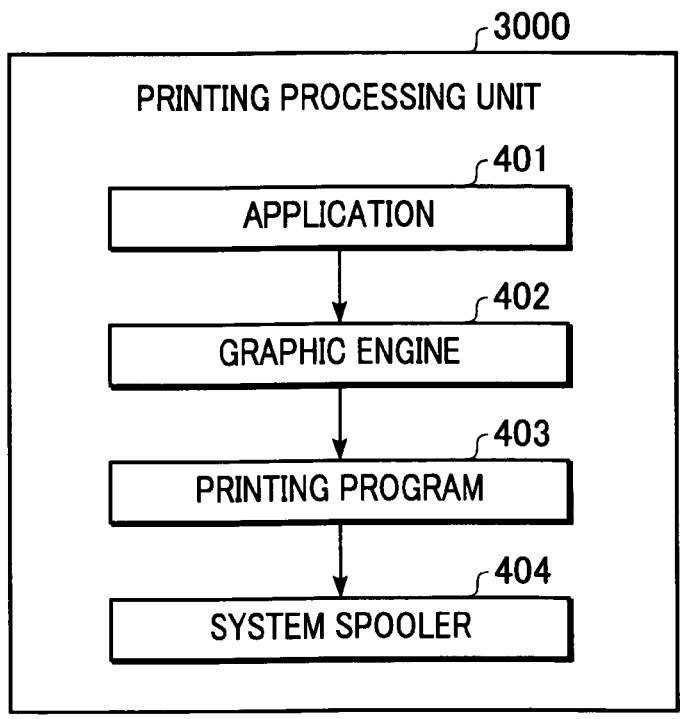
FIG. 4 is an example of a general printing processing unit in an information processing device corresponding to the embodiment of the present invention.

FIG. 4 is a configuration diagram of a typical printing processing unit 300 in an information processing device 201 in which a printing device 202 such as a printer, or the like, is directly connected, or is connected through a network. The printing processing unit 3000 is made up of modules such as an application 401, a graphic engine 402, a printing program 403 serving as the page description language generating unit, and a system spooler 404, and the like. The modules exist as files stored in the external memory 11 to be loaded to the RAM 2 and executed by the operating system or a module using the module.

The application 401 and the printing program 403 can be added to an external hard disk 11 by way of diskettes, unshown CD-ROM, or an unshown network. The application 401 stored in the external memory 11 is loaded to the RAM 2 and executed, but in the event of printing with the printer 202 from this application 401, output is performed using the graphic engine 402 which has been loaded into the RAM 2 in the same way and is executable.

The graphic engine 402 is loaded into the RAM 2 from the external memory 11 in the same way as the printing program 403, and converts logical drawing (e.g., Win32API) of the application 401 into a logical drawing command which the printing program 403 receives. The page description language generated by the printing program 403 is output to the printer 202 via the system spooler 404 loaded into the RAM 2 by the operating system and via the interface 203.

Figure 5A:
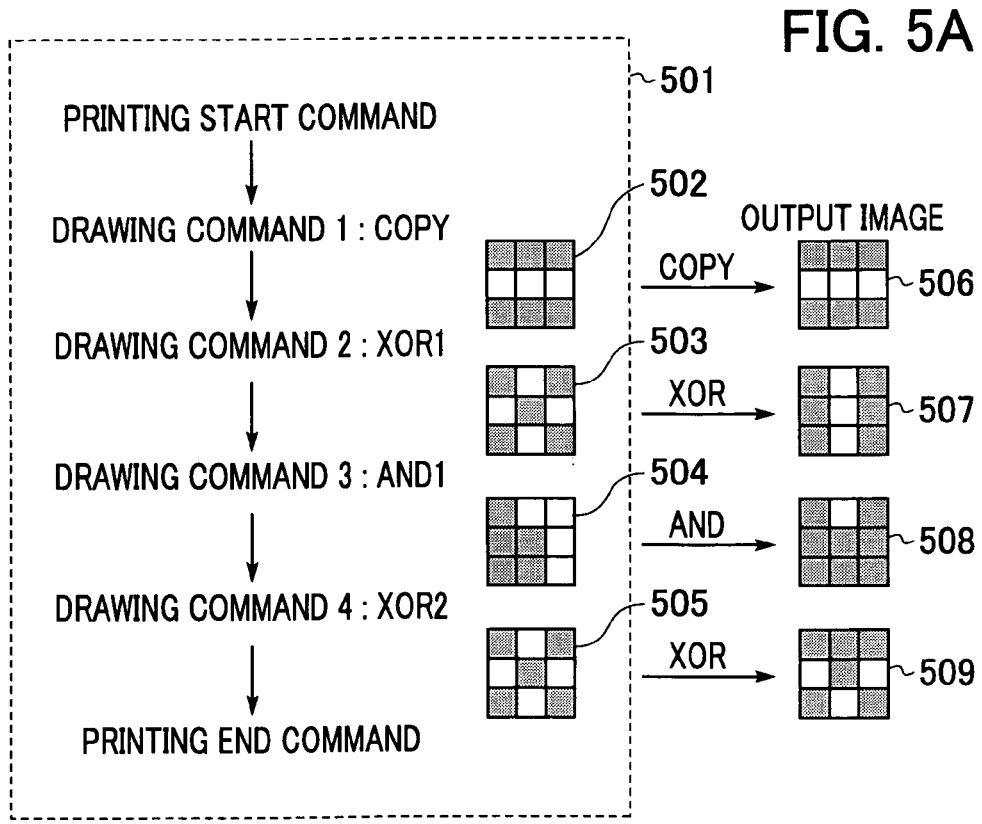
FIG. 5A is an example of a drawing command from an application 401 corresponding to the embodiment of the present invention.
Figure 5B:
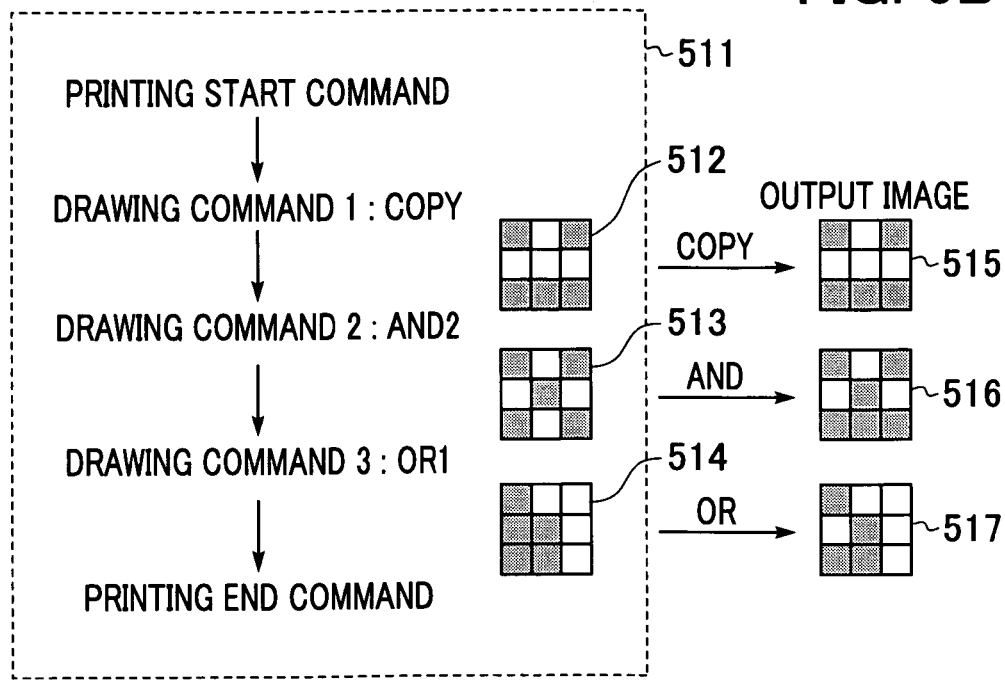
FIG. 5B is an example of a drawing command from an application 401 corresponding to the embodiment of the present invention.
Figure 5B:
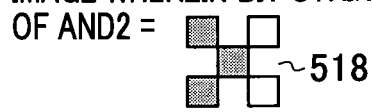
Figure 5C:
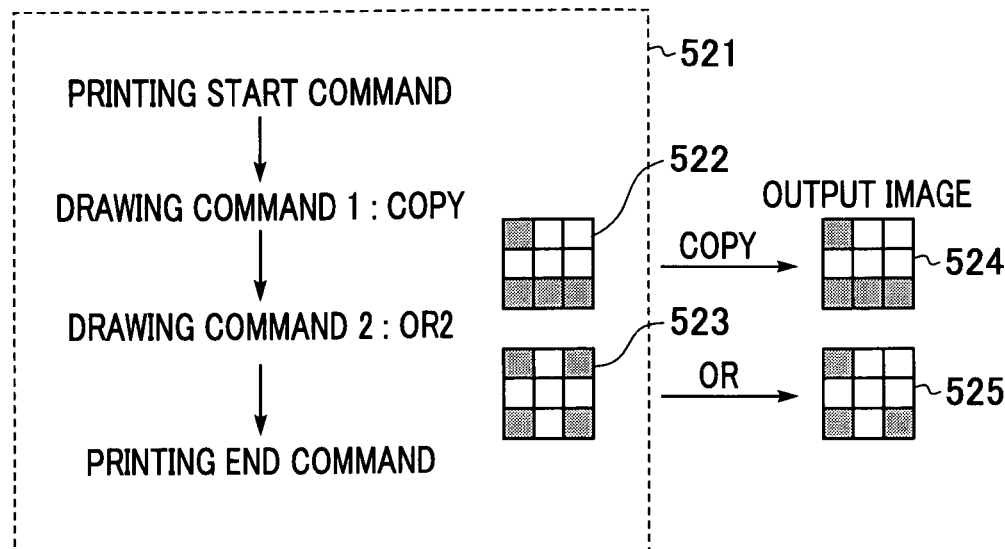
FIG. 5C is an example of a drawing command from an application 401 corresponding to the embodiment of the present invention.
Figure 5C:
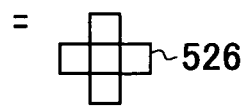

FIGS. 5A through 5C illustrate an example of a print request from an application according to the present embodiment. Here, a square shape 3 pixels by 3 pixels is used. However, it will be appreciated that the size, pixel density, and drawing attributes such as images or drawpath or text or the like is not an issue and may vary. The pixels here are expressed as black (meaning "0") and white (meaning "1").

An example of a print request 501 shown in FIG. 5A includes an application print start command, followed by a string of drawing requests (Drawing Command 1, Drawing Command 2, Drawing Command 3, Drawing Command 4) from the application 401, and finally a printing end command. Drawing Command 1 is a command to output the image 502 which results in output image 506. Drawing Command 2 is a command to output the XOR of the image already output 506 and the image 503. Drawing Command 3 is a command to output the AND of the image already output 507 and the image 504. Drawing Command 4 is a command to output the XOR of the already output image 508 and the image 505.

Accordingly, the output given by the application with regard to the series of drawing commands shown in FIG. 5A is an output image 509. FIG. 5A also shows an image 510 that is used to serve as a substituting drawing command.

An example of a print request 511 is shown in FIG. 5B and includes an application print start command, followed by a string of drawing requests (Drawing Command 1, Drawing Command 2, Drawing Command 3) from the application 401, and finally a printing end command. Drawing Command 1 is a command to output the image 512 resulting in output image 515. Drawing Command 2 is a command to output the AND of the image 515 already output and the image 513 resulting in output image 516. Drawing Command 3 is a command to output the OR of the image already output image 516 and the image 514.

Accordingly, an output image 517 given by the application with regard to the series of drawing commands results. An image 518 used to serve as a substituting drawing command is also shown in FIG. 5B.

An example of a print request 521 is shown in FIG. 5C and includes an application print start command, followed by a string of drawing requests (Drawing Command 1, Drawing Command 2) from the application 401, and finally a printing end command. Note that Drawing Command 1 is a command to output the image 522 which results in output image 524. Drawing Command 2 is a command to output the OR2 of the image 524 already output and the image 523.

Accordingly, an output image 525 is given by the application 401 with regard to the series of drawing commands shown in FIG. 5C. An image 526 used to serve as a substituting drawing command is also shown in FIG. 5C.

In this way, the embodiment of the present invention is capable of optimizing complicated raster operations using applications, both in output size and drawing quality, and can draw correctly even with non-supporting page description language systems.

FIG. 6 illustrates a ROP reference table which the printing program 403 according to the present invention statically holds. The ROP reference table has multiple entries, and registers the substitution conditions for drawing commands. The table includes an address region 601 for identifying the entries and a region where the ROP structure is placed 602. An optional number of ROP structures can be placed in the region where the ROP structures are stored 602. The ROP structure order in the ROP structure region 602 corresponds to the order of receiving the drawing commands by the printing program 403. A conditional expression region 603 is a region for describing the conditions for substituting the ROP structure strings with the output commands 604.

FIG. 7 illustrates the structure of a ROP structure described in the ROP reference table (shown in FIG. 6). The structure includes a region for describing the type of ROP 701, a region for storing the type of drawing, text, graphics, images, and so forth 702, a region for storing the name of the application performing the drawing 703, and a region for storing the bounding size for drawing 704. The structure may also include a region for storing various attributes 705.

FIG. 8 illustrates a ROP sequence table for storing drawing commands of actual ROPs. The components store the ROP structure (FIG. 7) in the order that drawing was actually performed.

With the present embodiment, the application gives logical drawing commands to the printing program, such as shown in FIGS. 5A through 5C.

Figure 9:
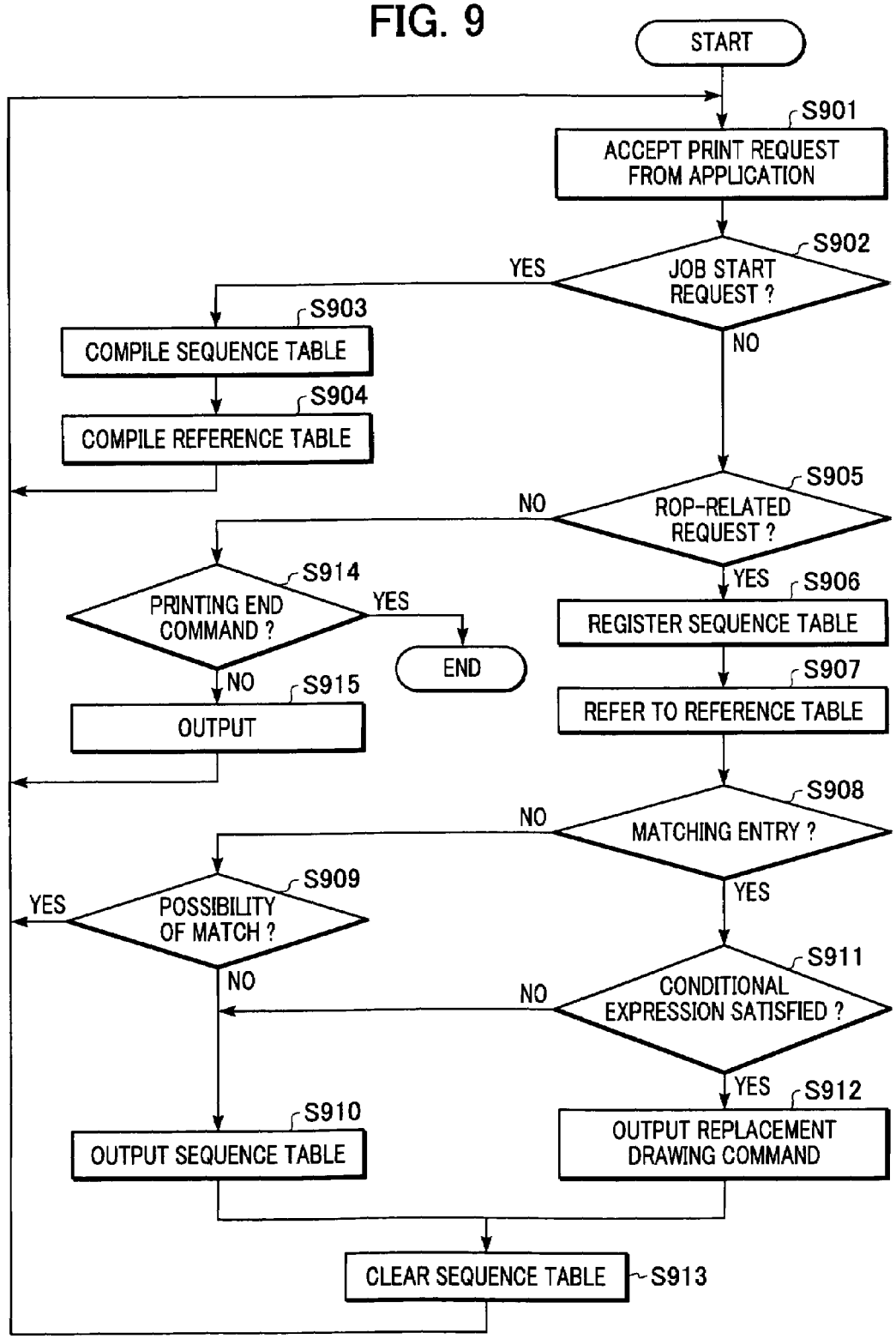
FIG. 9 is a flowchart of an example of processing which corresponds to the embodiment of the present invention.

A general processing flow will be described with reference to FIG. 9. FIG. 9 is a flowchart describing an example of page description language generating processing realized with the printing program 403.

First, the printing program 403 accepts a printing request from the application 401 (S901). Here, this is described as being reception of a printing request from the application 401, but when viewed from the side of the printing program 403, this constitutes receiving a logical drawing command from the graphic engine 402. Note that the print request from the application 401 is a process repeated until a print job end request is received later.

The printing program 403 determines whether the print request is a print job starting request or not (S902). In the event that this is a print job starting request, a ROP sequence table (S903), such as the one shown in FIG. 8, and ROP reference table (S904), such as the one shown in FIG. 6, are constructed in available memory of the RAM 2, and the flow returns to S901. In the event that this is not a print job starting request (S902), the printing program 403 determines whether or not this is a ROP-related request (S905).

Normally, ROP-related commands are given from the application 401, so determining whether a ROP-related command or not is performed at the printing program 403. In the event that the command is determined to be a ROP-related command in S905, the flow proceeds to S906, and the printing program 403 stores the ROP structure by adding it to the ROP sequence table.

Next, in S907, the printing program 403 makes reference to the reference table. The entry string of the ROP structure on the ROP sequence table and the entry string of the ROP reference table are compared, and in the event that there is a matching entry (S908) and the conditional expression 603 is also satisfied (S911), the printing program 403 substitutes the drawing command contained in the entry with the substitute drawing command 604 and outputs this (S912). This output can be output as a PDF command within a PDF file, for example.

In the event that there is not matching entry in S908, the printing program 403 determines in S909 whether or not there is any possibility of the contents of the sequence table matching the reference table in the future, and in the event that determination is made that there is the possibility of matching, the flow returns to S901 and accepts the next drawing request from the application 401. Determination of matching possibility will be described later.

On the other hand, in the event that determination is made that there is no possibility of the contents of the sequence table matching the reference table in the future in S909 or if there was a matching entry (S908) but the conditional expression was not satisfied (S911), the printing program 403 outputs the contents of the sequence table in order, as PDF commands within a PDF file, for example (S910), clears the sequence table (S913), and the flow returns to S901.

In S905, in the event that the drawing request is not a ROP-related request, the printing program 403 determines whether or not this is a printing end command. In the event that this is not a printing end command in S914, the printing program 403 outputs drawing commands as PDF commands within a PDF file, for example (S915), and the flow returns to S901. In the event that this is a printing end command from the application 401 in S914, the printing process ends.

Next, the processing in the event that the drawing request from the application 401 is that shown in FIGS. 5A through 5C will be described corresponding to the flowchart in FIG. 9. In the printing request from the application 401 (S901), the printing request from the application 401 is repeatedly executed thereafter until a printing end command is received later. First, is a printing start command (S902), so a ROP sequence table (S903) and ROP reference table (S904) are constructed in available memory of the RAM 2, and the flow returns to S901.

FIG. 10 is a ROP reference table which the printing program statically constructs at the time of starting the job. While three entries are shown here, this is to be understood to be nothing more than an example, and entries registered in a ROP reference table are not restricted to these. The ROP reference table includes a value indicating the address in the table 1001, as well as each entry 1002. While the individual entries 1002 are shown including attribute values as shown in FIG. 11, these may contain other attribute values as well.

The ROP reference table shown in FIG. 10 includes a conditional expression 1003 indicating that the drawing command is to be substituted in the event that the attributes of all ROP structures match. The ROP reference table also includes the drawing command for substitution 1004 indicating a drawing command. For example, as shown in FIG. 10, in the case of address 0, the drawing component of XOR2 is to be masked with the black portion of AND1 (the background of the black portion is to be made transparent). More specifically, this is a command to draw the image 510 shown in FIG. 5A.

In the same way, in the case of address 1, the bit string of OR1 is to be masked with the black portion of AND2. More specifically, this is a command to draw the image 518 shown in FIG. 5B. Further, with address 2, the white portion of OR2 is to be drawn. More specifically, this is a command to draw the image 526 shown in FIG. 5C.

In S901, the Drawing Command 1 is received, whereby the printing program 403 determines whether or not the drawing command is a ROP realization request. The Drawing Command 1 is determined to be not a ROP-related drawing request since this is "COPY" (S905), and accordingly is output without change in S915.

Figure 12A:
FIGS. 12A through 12C are examples of a ROP sequence table according to the embodiment of the present invention.

Next, in S901, Drawing Command 2 is received. In S905, this drawing command is determined to be a ROP-related request, and is registered to the ROP sequence table in S906. The contents of the ROP sequence table are as shown in FIG. 12A. Next, in step S907, reference is made to the ROP reference table. There is nothing in the ROP reference table which matches the ROP sequence table, so the flow proceeds to S909.

In S909, the possibility of matching is determined. Here, the ROP sequence table is a sub-set of the ROP reference table, meaning that there is a probability of a future match, so determination is made that there is a possibility of matching (YES in S909), and the flow returns to S901 and receives the next drawing request. That is to say, this matching possibility is determined with regard to whether or not there is a portion matching with the drawing command registered in the ROP sequence table, regarding the type of ROP structure as a drawing command in the ROP reference table and in the order of receiving ROP structures as drawing commands.

Figure 12B:

In S901, the Drawing Command 3 is received, and upon determining that this is a ROP-related request in S905, registration is made to the ROP sequence table in S906. The contents of the ROP sequence table at this time are as shown in FIG. 12B.

Figure 12C:
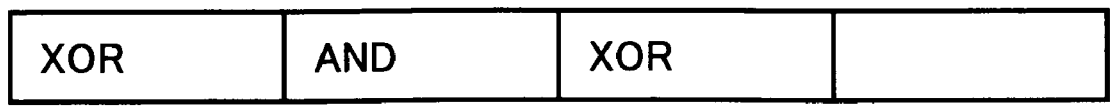

Next, in S907, reference is made to the ROP reference table. There is nothing in the ROP reference table which matches the ROP sequence table, so the flow proceeds to S909. Here, the ROP sequence table is a sub-set of the ROP reference table, meaning that there is a probability of a future match, so the flow returns to S901 and receives the next drawing request, Drawing Command 4. Upon determining that Drawing Command 4 is a ROP-related request in S905, registration is made to the ROP sequence table in S906. The contents of the ROP sequence table at this time are as shown in FIG. 12C.

Next, in S907, reference is made to the ROP reference table. Here, the ROP reference table and the ROP sequence table match completely at the entry of address 0 (S908), the ROP structures are all the same, and also the conditional expression is satisfied (S911), so the flow proceeds to S912 and outputs drawing commands for substituting the Drawing Command 2 through Drawing Command 4. The drawing command to be output at this time is the drawing command of the image wherein the image 505 of XOR2 is masked with the black portion of the image 504 of AND1, and more specifically is the drawing command of the image 510. It can be understood that overwriting the image 510 on top of the image 506 already output in the Drawing Command 1 will match the image 509 shown in FIG. 5.

Following outputting the substitution drawing command, the ROP sequence table is cleared in S913, and a new drawing request is received in S901. In the event of receiving a printing end request instead of a print command (YES in S914), the printing processing ends.

As described above, according to the invention corresponding to the present embodiment, the same results can be obtained as logical operations can be obtained by executing only overwriting, even in the case of page description languages which logical operations cannot be performed due to specifications (e.g., PDF, PS, etc.).

That is to say, according to the invention corresponding to the present embodiment, with drawing commands such as indicated in FIG. 5A, the first Drawing Command 1 is output as, for example, a PDF command in a PDF file as it is for "overwrite", and the logical Drawing Commands 2, 3, and 4 are not output but cached, and at the point that the logical Drawing Command 4 is received the multiple logical Drawing Commands are substituted with a single drawing command and output. Thus, the same drawing can be performed for language specifications which handle only overwriting and cannot perform logical drawing.

Second Embodiment

While the first embodiment has been made specifically with regard to images for the ROP structure attributes, the objects to be drawn to which ROP is applicable are not restricted to images; this is also applicable to drawpaths and text, for example. This is because on/off control of bits is the same with the device coordinates.

For example, let us consider a case of a sequence for graphics, wherein ROP drawing draws a drawpath point in FIG. 5A in the first embodiment. In this case, the present invention works with a drawpath in the same way as with the first embodiment in that the Drawing Command 2 through the Drawing Command 4 are substituted at the black portion of the drawpath corresponding to the image 504 of AND1 in FIG. 5A, due to the command for a drawpath wherein the drawpath corresponding to XOR2 is to be masked.

Other Embodiments

Note that the present invention may be applied to a system configured of multiple devices (e.g., a host computer, interface device, reader, printer, etc.) or a single apparatus (e.g., a photocopier, facsimile apparatus, etc.).

Embodiments of the present invention can be achieved by a storage medium, storing program code for software which realizes the functions of the above-described embodiments, being supplied to a system or device, with the computer (or CPU or MPU(micro-processing unit)) of the system or device reading out the program code stored in the storage medium and executing the program code. In this case, the program code itself, read out from the storage medium, constitutes the present invention. Also, the present invention is not restricted to arrangements where the functions of the above-described embodiments are realized by a computer executing the program code which has been read out The present invention may also encompass arrangements where an operating system running on a computer performs part or all of the processing based on the commands of the program code, so that the functions of the above-described embodiments are realized.

Further, the present invention encompasses arrangements where program code read out from the recording medium is written into memory with function expansion cards or function expansion units connected to the computer, following which a CPU or the like provided to the function expansion card or function expansion unit performs part or all of the processing based on the commands of the program code, so that the functions of the above-described embodiments are realized.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for generating page description language, the method, comprising:
   (a) accepting a drawing command;
   (b) determining whether or not the accepted drawing command is a logical drawing command;
   (c) if the accepted drawing command is a logical drawing command, adding the accepted drawing command to a held drawing command sequence table;
   (d) comparing the held drawing command sequence table with entries in a reference table including registered substitution conditions for drawing commands to determine if there is an entry in the reference table that matches the held drawing command sequence table; and
   (e) if there is an entry in the reference table that matches the held drawing command sequence table:
      (i) obtaining a substitution drawing command from the reference table for the entry in the reference table that matches the held drawing command sequence table;
      (ii) generating page description language by outputting the substitution drawing command; and
      (iii) clearing the held drawing command sequence table.

2. The method according to claim 1, further comprising: if there are not any entries in the reference table that match the held drawing command sequence table:
   generating page description language for the accepted drawing commands in the held drawing command sequence table by outputting the accepted drawing commands in the held drawing command sequence table based on an order of accepting the drawing commands in the held drawing command sequence table; and
   clearing the held drawing command sequence table.

3. The method according to claim 1, further comprising:
   if there are not any entries in the reference table that match the held drawing command sequence table, determining whether there is a possibility that at least one entry in the reference table will match the held command sequence table if additional drawing commands are accepted and added to the held drawing command sequence table; and
   if it is determined that there is a possibility that at least one entry in the reference table will match the held drawing command sequence table if additional drawing commands are accepted and added to the held drawing command sequence table, repeating (a)-(e).

4. The method according to claim 3, further comprising: if there are not any entries in the reference table that match the held drawing command sequence table and it is determined that there is not a possibility that any of the entries in the reference table will match the held drawing command sequence table if additional drawing commands are accepted and added to the held drawing command sequence table:
   generating page description language for the accepted drawing commands in the held drawing command sequence table by outputting the accepted drawing commands in the held drawing command sequence table based on an order of accepting the drawing commands in the held drawing command sequence table; and
   clearing the held drawing command sequence table.

5. The method according to claim 1, wherein the entries in the reference table include, as the registered substitution conditions, a type of drawing command, an order of accepting the drawing commands, and conditions regarding the drawing commands.

6. The method according to claim 5, wherein, determining if there is an entry in the reference table that matches the held drawing command sequence table is determined based on whether or not the type of drawing command, the order of accepting the drawing commands, and the conditions regarding the drawing commands in the reference table, match those of the held drawing command sequence table.

7. The method according to claim 5, further comprising: if there are not any entries in the reference table that match the held drawing command sequence table, determining whether there is a possibility that at least one entry in the reference table will match the held command sequence table if additional drawing commands are accepted and added to the held drawing command sequence table based on whether or not the type of drawing command, the order of accepting the drawing commands, and the conditions regarding the drawing commands for a portion of the at least one entry in the reference table, match those of the held drawing command sequence table.

8. The method according to claim 1, further comprising: if it is determined that the accepted drawing command is not a logical drawing command, generating page description language by outputting the accepted drawing command without substitution.

9. A computer-readable medium encoded with computer-executable instructions for generating page description language, the computer-readable program comprising code for:
   (a) accepting a drawing command;
   (b) determining whether or not the accepted drawing command is a logical drawing command;
   (c) adding the accepted drawing command to a held drawing command sequence table if the accepted drawing command is a logical drawing command;
   (d) comparing the held drawing command sequence table with entries in a reference table including registered substitution conditions for drawing commands to determine if there is an entry in the reference table that matches the held drawing command sequence table; and
   (e) if there is an entry in the reference table that matches the held drawing command sequence table:
      (i) obtaining a substitution drawing command from the reference table for the entry in the reference table that matches the held drawing command sequence table;
      (ii) generating page description language by outputting the substitution drawing command; and
      (iii) clearing the held drawing command sequence table.

10. A computer-readable medium encoded with computer-executable instructions according to claim 9, further comprising code wherein if there are not any entries in the reference table that match the held drawing command sequence table:
    generating page description language for the accepted drawing commands in the held drawing command sequence table by outputting the accepted drawing commands in the held drawing command sequence table based on an order of accepting the drawing commands in the held drawing command sequence table; and clearing the held drawing command sequence table.

11. A computer-readable medium encoded with computer-executable instructions according to claim 9, further comprising code wherein:

if there are not any entries in the reference table that match the held drawing command sequence table, determining whether there is a possibility that at least one entry in the reference table will match the held command sequence table if additional drawing commands are accepted and added to the held drawing command sequence table; and if it is determined that there is a possibility that at least one entry in the reference table will match the held drawing command sequence table if additional drawing commands are accepted and added to the held drawing command sequence table, repeating (a)-(e).

12. A computer-readable medium encoded with computer-executable instructions according to claim 11, further comprising code wherein if there are not any entries in the reference table that match the held drawing command sequence table and it is determined that there is not a possibility that any of the entries in the reference table will match the held drawing command sequence table if additional drawing commands are accepted and added to the held drawing command sequence table:

generating page description language for the accepted drawing commands in the held drawing command sequence table by outputting the accepted drawing commands in the held drawing command sequence table based on an order of accepting the drawing commands in the held drawing command sequence table; and clearing the held drawing command sequence table.

13. A computer-readable medium encoded with computer-executable instructions according to claim 9, wherein the entries in the reference table include, as the registered substitution conditions, a type of drawing command, an order of accepting the drawing commands, and conditions regarding the drawing commands.

14. A computer-readable medium encoded with computer-executable instructions according to claim 13, further comprising code for determining if there is an entry in the reference table that matches the held drawing command sequence table based on whether or not the type of drawing command, the order of accepting the drawing commands, and the conditions regarding the drawing commands in the reference table, match those of the held drawing command sequence table.

15. A computer-readable medium encoded with computer-executable instructions according to claim 13, further comprising code wherein if there are not any entries in the reference table that match the held drawing command sequence table, determining whether there is a possibility that at least one entry in the reference table will match the held command sequence table if additional drawing commands are accepted and added to the held drawing command sequence table based on whether or not the type of drawing command, the order of accepting the drawing commands, and the conditions regarding the drawing commands for a portion of the at least one entry in the reference table, match those of the held drawing command sequence table.

16. A computer-readable medium encoded with computer-executable instructions according to claim 9, further comprising code wherein if it is determined that the accepted drawing command is not a logical drawing command, page description language is generated by outputting the accepted drawing command without substitution.

17. An information processing device, comprising:

drawing command accepting means for accepting a drawing command;

determining means for determining whether or not the accepted drawing command is a logical drawing command;

holding means for adding the accepted drawing command to a held drawing command sequence table if the accepted drawing command is a logical drawing command;

comparing mans for comparing the held drawing command sequence table with entries in a reference table including registered substitution conditions for drawing commands to determine if there is an entry in the reference table that matches the held drawing command sequence table; and page description language generating means for, upon determination by the comparing means that there is an entry in the reference table that matches the held drawing command sequence table, obtaining a substitution drawing command from the reference table for the entry in the reference table that matches the held drawing command sequence table, generating page description language by outputting the substitution drawing command, and clearing the held drawing command sequence table.

18. The information processing device according to claim 17, wherein the page description language generating means, upon determination by the comparing unit that there are not any entries in the reference table that match the held drawing command sequence table, generated page description language for the accepted drawing commands in the held drawing command sequence table by outputting the accepted drawing commands in the held drawing command sequence table based on an order of accepting the drawing commands in the held drawing command sequence table, and clears the held drawing command sequence table.

19. The information processing device according to claim 17, wherein if the comparing means determines that there are not any entries in the reference table that match the held drawing command sequence table, the comparing means determines whether there is a possibility that at least one entry in the reference table will match the held command sequence table if additional drawing commands are accepted by the drawing command accepting means and added to the held drawing command sequence table by the holding means; and if the comparing unit determines that there is a possibility that at least one entry in the reference table will match the held drawing command sequence table if additional drawing commands are accepted and added to the held drawing command sequence table:

the drawing command accepting means accepts an additional drawing command;

the determining means determines whether or not the accepted additional drawing command is a logical drawing command;

the holding means adds the additional accepted drawing command to the held drawing command sequence table if the accepted drawing command is a logical drawing command;

the comparing means compares the held drawing command sequence table including the additional accepted drawing command with entries in the reference table to determine if there is an entry in the reference table that matches the held drawing command sequence table with the additional accepted drawing command; and if the comparing means determines that there is an entry in the reference table that matches the held drawing command sequence table with the additional accepted drawing command, the page description language generating means obtains the substitution drawing command from the reference table for the entry in the reference table that matches the held drawing command sequence table including the additional accepted drawing command, generates page description language by outputting the substitution drawing command, and clears the held drawing command sequence table.

20. The information processing device according to claim 19, wherein if the comparing means determines that there are not any entries in the reference table that match the held drawing command sequence table and there is not a possibility that any of the entries in the reference table will match the held drawing command sequence table if additional drawing commands are accepted by the drawing command accepting means and added to the held drawing command sequence table by the holding means, the page description language generating means generates page description language for the accepted drawing commands in the held drawing command sequence table by outputting the accepted drawing commands in the held drawing command sequence table based on an order of accepting the drawing commands in the held drawing command sequence table, and clears the held drawing command sequence table.

21. The information processing device according to claim 17, wherein the entries in the reference table include, as the registered substitution conditions, a type of drawing command, an order of accepting the drawing commands, and conditions regarding the drawing commands.

22. The information processing device according to claim 21, wherein, the comparing means determines if there is an entry in the reference table that matches the held drawing command sequence table based on whether or not the type of drawing command, the order of accepting the drawing commands, and the conditions regarding the drawing commands in the reference table, match those of the held drawing command sequence table.

23. The information processing device according to claim 21, wherein if the comparing means determines that there are not any entries in the reference table that match the held drawing command sequence table, the comparing means determines whether there is a possibility that at least one entry in the reference table will match the held command sequence table if additional drawing commands are accepted and added to the held drawing command sequence table based on whether or not the type of drawing command, the order of accepting the drawing commands, and the conditions regarding the drawing commands for a portion of the at least one entry in the reference table, match those of the held drawing command sequence table.

24. The information processing device according to claim 17, wherein if the comparing means determines that the accepted drawing command is not a logical drawing command, the page description language generating means generates page description language by outputting the accepted drawing command without substitution.

* * * * *